(12) United States Patent
Hirooka et al.

(10) Patent No.: US 9,457,756 B2
(45) Date of Patent: Oct. 4, 2016

(54) WORK VEHICLE

(71) Applicant: KUBOTA CORPORATION, Osaka (JP)

(72) Inventors: Yoshimi Hirooka, Osaka (JP); Takashi Kuramoto, Osaka (JP); Kohta Nakao, Osaka (JP); Katsuhiro Wakabayashi, Osaka (JP); Kyouhei Hamamura, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/641,725

(22) Filed: Mar. 9, 2015

(65) Prior Publication Data

US 2016/0090057 A1  Mar. 31, 2016

(30) Foreign Application Priority Data

Sep. 30, 2014  (JP) .............................. 2014-201043

(51) Int. Cl.
| | | |
|---|---|---|
| *B60R 21/13* | (2006.01) | |
| *B60R 9/06* | (2006.01) | |
| *B60N 2/30* | (2006.01) | |

(52) U.S. Cl.
CPC ................ *B60R 21/13* (2013.01); *B60N 2/30* (2013.01); *B60N 2/305* (2013.01); *B60N 2/3031* (2013.01); *B60R 9/06* (2013.01)

(58) Field of Classification Search
CPC  B60R 2021/134; B60P 3/423; B62D 47/003
See application file for complete search history.

(56) References Cited

U.S. PATENT DOCUMENTS

| | | | | |
|---|---|---|---|---|
| D592,998 S | * | 5/2009 | Woodard, Jr. ................. | D12/14 |
| 7,581,780 B2 | * | 9/2009 | Shimamura ............... | B60P 1/16 296/183.2 |
| 7,735,903 B2 | * | 6/2010 | Yamamura ............. | B60N 2/005 180/312 |
| 7,841,639 B2 | * | 11/2010 | Tanaka ................. | B60N 2/3031 296/183.2 |
| 8,002,331 B2 | * | 8/2011 | Bowers ................ | B60N 2/3013 296/183.2 |
| 8,079,602 B2 | * | 12/2011 | Kinsman ............. | B60G 15/063 280/5.512 |
| 8,215,690 B2 | * | 7/2012 | Nishiike ................. | B60P 3/423 296/186.4 |
| 8,328,235 B2 | * | 12/2012 | Schneider ............. | B60J 5/0487 280/748 |
| 8,353,534 B2 | * | 1/2013 | Arnold ................. | B60N 2/3013 280/748 |

(Continued)

FOREIGN PATENT DOCUMENTS

JP  2011-116318  6/2011

OTHER PUBLICATIONS

U.S. Appl. No. 14/641,714 to Kohta Nakao et al., filed Mar. 9, 2015.

*Primary Examiner* — Nicole Verley
(74) *Attorney, Agent, or Firm* — Greenblum & Bernstein, P.L.C.

(57) ABSTRACT

A work vehicle includes a vehicle body frame. A cockpit section or platform is arranged at a front section of the vehicle. A carrier bed is provided at a rear section of the vehicle. A ROPS includes a pair of left and right front supporting columns, a pair of left and right rear supporting columns, and a rearward overhanging frame extending rearward from upper part of the rear supporting columns.

23 Claims, 9 Drawing Sheets

(56) References Cited

U.S. PATENT DOCUMENTS

| | | | | |
|---|---|---|---|---|
| 8,387,734 | B2 * | 3/2013 | Krosschell | B60G 9/003 180/89.11 |
| 8,499,870 | B2 * | 8/2013 | Nakamura | B62D 21/186 180/68.3 |
| 8,567,846 | B1 * | 10/2013 | Stevens | B60N 2/36 296/183.1 |
| 8,640,814 | B2 * | 2/2014 | Deckard | B60R 21/13 180/312 |
| 8,690,217 | B2 * | 4/2014 | Yamamoto | B62D 33/0273 296/183.1 |
| 8,714,618 | B1 * | 5/2014 | Heit | B60P 3/423 296/64 |
| 8,752,878 | B2 * | 6/2014 | Yamamoto | B62D 33/0273 296/146.1 |
| 8,752,879 | B1 * | 6/2014 | Heit | B60P 3/423 296/39.1 |
| 8,757,662 | B2 * | 6/2014 | Deschambault | B60R 21/13 280/756 |
| D719,061 | S * | 12/2014 | Tandrup | B60K 1/00 D12/87 |
| 8,973,691 | B2 * | 3/2015 | Morgan | B60K 1/00 180/291 |
| 8,998,253 | B2 * | 4/2015 | Novotny | B60R 21/13 280/756 |
| 9,004,532 | B1 * | 4/2015 | Hirooka | B60R 21/13 180/330 |
| 9,045,104 | B2 * | 6/2015 | Kuroda | B60R 21/13 |
| 9,056,576 | B2 * | 6/2015 | Yamamoto | B60P 3/423 |
| 9,145,092 | B1 * | 9/2015 | Reynolds | B60R 21/11 |
| 9,150,182 | B1 * | 10/2015 | Schlangen | B60G 3/20 |
| 9,216,777 | B2 * | 12/2015 | Nakamura | B62D 33/02 |
| 2009/0256388 | A1 * | 10/2009 | Tanaka | B60N 2/3031 296/186.4 |
| 2010/0060026 | A1 * | 3/2010 | Bowers | B60N 2/3013 296/66 |
| 2011/0298189 | A1 * | 12/2011 | Schneider | B60J 5/0487 280/80.1 |
| 2012/0056411 | A1 * | 3/2012 | Nakamura | B62D 21/186 280/756 |
| 2013/0256050 | A1 * | 10/2013 | Novotny | B60R 21/13 180/271 |
| 2014/0034409 | A1 * | 2/2014 | Nakamura | B62D 21/186 180/291 |
| 2014/0124279 | A1 * | 5/2014 | Schlangen | B60G 3/20 180/68.4 |
| 2014/0353956 | A1 * | 12/2014 | Bjerketvedt | B60N 3/06 280/756 |
| 2015/0375803 | A1 * | 12/2015 | Raska | B62D 33/0207 280/639 |

* cited by examiner

WORK VEHICLE

CROSS-REFERENCE TO RELATED APPLICATIONS

The present application claims priority under 35 U.S.C. §119 of Japanese Application No. 2014-201043, filed on Sep. 30, 2014, the disclosure of which is expressly incorporated by reference herein in its entirety.

BACKGROUND OF THE INVENTION

1. Field of the Invention

The present invention relates to a work vehicle equipped with a vehicle body, a cockpit structure or platform installed at the front section of a vehicle body, a carrier bed provided at the rear section of a vehicle body, and a Rollover Protective Structure (ROPS) forming the cockpit platform.

2. Description of Related Art

The above described work vehicle is provided with a cockpit platform installed on the front section of a vehicle body, a carrier bed provided on the rear section of the vehicle body, and a Rollover Protective Structure (ROPS) forming the cockpit platform.

A work vehicle of this type is known from, for example, the work vehicle described Japanese Patent Laid-open Publication 2011-116318. The rear platform, or the carrier bed can be located behind the cockpit platform for instance, in a work vehicle of this type. Further, a work vehicle of this type requires a suitable ROPS structure.

SUMMARY OF THE INVENTION

A work vehicle according to the invention includes a vehicle body; a cockpit platform provided in the front section of the vehicle body; a carrier bed provided in a rear section of the vehicle body; and a rollover protective structure forming the cockpit platform. The rollover protective structure includes a pair of left and right front supporting columns provided in front of the cockpit platform; a pair of left and right rear supporting columns provided behind the cockpit platform; and a rearward overhanging frame that extends rearward from an upper part of the rear supporting columns behind the rear supporting columns.

Thus, given the above mentioned structure, the rearward overhanging frame extends to the rear of the rollover protective structure. The rear platform, the carrier bed, and the like are located at the rearward section of the rollover protective structure. When the rear platform is located at the rearward section of the rollover protective structure, the rearward overhanging frame may be used as a protective structure that forms the rear platform. Additionally, when a carrier bed is located at the rearward section of the rollover protective structure may be used as a reinforcing structure for a roof for the carrier bed, for instance.

In the above-mentioned configuration, the rollover protective structure may include a pair of left and right front frames connecting an upper part of the left and right front supporting columns and an upper part of the left and right rear supporting columns. The rearward overhanging frame preferably extends rearward from the rear end portion of the front frame. The rearward overhanging frame may include a pair of left and right rear frames extending lengthwise, and a first coupling frame that couples rear end portions of the pair of left and right rear frames.

Thus, with the above-mentioned structure, the rearward overhanging frame may be configured to continue from the front frame.

The rearward overhanging frame may include a second coupling frame that couples the pair of left and right rear frames at portions in front of locations coupled by the first coupling frame.

Thus, the above-mentioned structure suitably reinforces the rearward overhanging frame.

In the above mentioned configuration, the rollover protective structure may include a pair of left and right third coupling frames extending from the second coupling frame and coupling the pair of left and right front frames. The rollover protective structure may include a second coupling frame and a pair of left and right third coupling frames. The second coupling frame couples any one of the portions in front of locations on the pair of left and right rear frames coupled by the first coupling frame, and the pair of front left and right front frames. The pair of left and right third coupling frames extends from the second coupling frame, and couples any other one of the pair of left and right front frames, and the pair of left and right rear frames.

In the above-mentioned configuration, the second coupling frame and the third coupling frames couple the front frame and the rear frame by striding over the rear columns; thus, suitably reinforcing the transition portion from the front frame to the rear frame.

The rearward overhanging frame may include a fourth coupling frame that couples the first coupling frame and the second coupling frame.

Thus, the above-mentioned structure suitably reinforces the rearward overhanging frame.

In the above-mentioned configuration the rollover protective structure may include a reinforcing support column extending upward from a position lengthwise near the rear supporting columns and extending rearward from the rearward overhanging frame.

Thus, the above-mentioned configuration secures a space behind the cockpit platform, and the reinforcing support column suitably supports the rearward overhanging frame.

In the above-mentioned configuration, the rearward overhanging frame may form a rear platform provided behind the cockpit platform.

Thus, the configuration allows the rearward overhanging frame to be used as a protective structure protecting the rear platform.

In the above-mentioned configuration, the carrier bed may be configured to switch between a first mode and a second mode; the first mode being where, when viewed from the top, the front end of the carrier bed is located behind the rearward overhanging frame, and the second mode being where, when viewed from the top, the front end of the carrier bed enters a position that overlaps with the rearward overhanging frame.

Further, in the above-mentioned configuration, the rear seat may be configured switchable between a seating mode and a storage mode. In the seating mode, the rear seat is secured in a seating location toward the rear section of the rear platform. In the storage mode, the rear seat is secured at a location in front of the seating location in the rear platform. The carrier bed may be configured such that when the rear seat switches to the storage mode, the carrier bed is in the empty seating location in a second mode.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
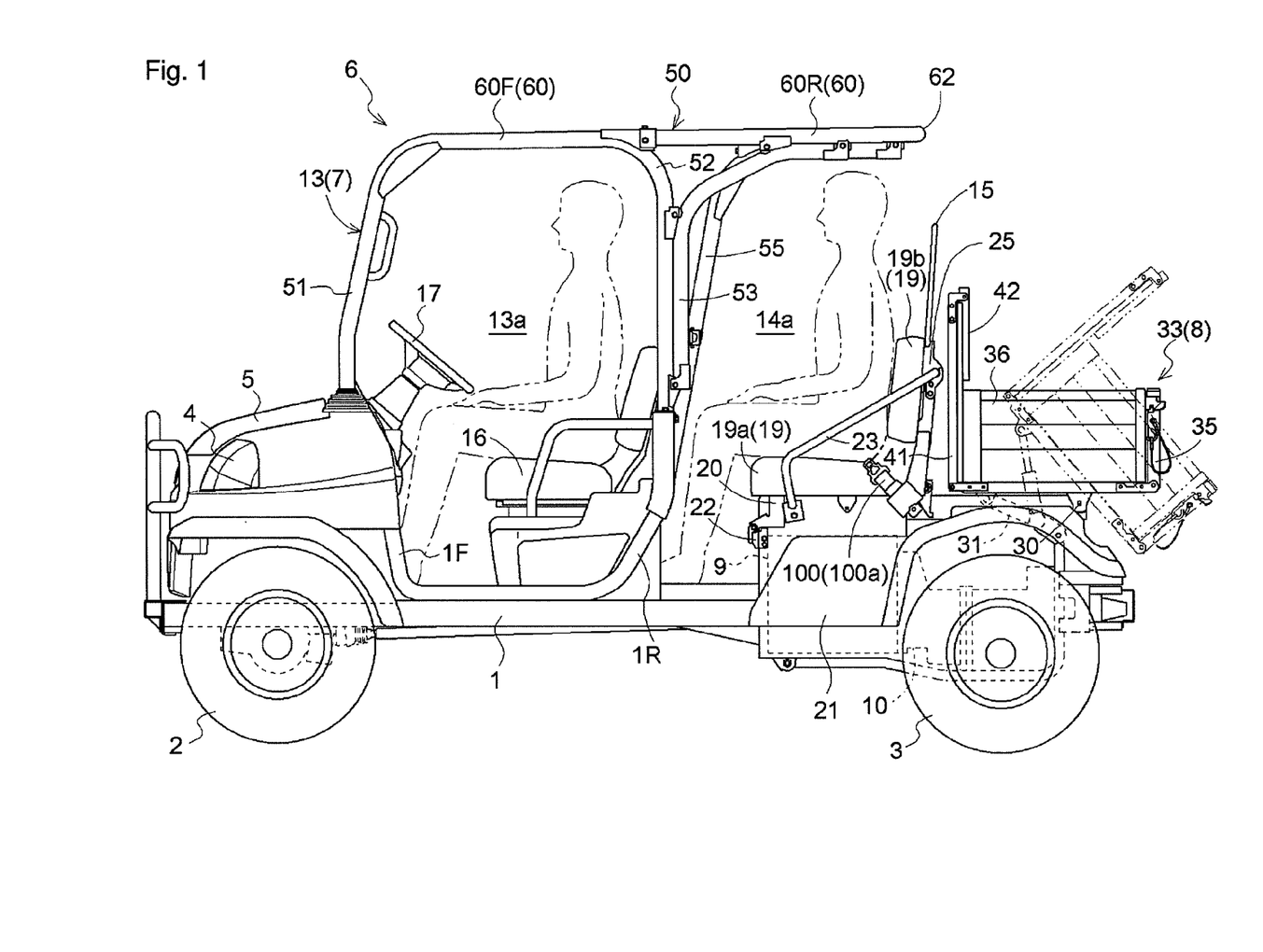
FIG. 1 is a side view illustrating an entire work vehicle while a carrier bed on the work vehicle is switched to a first mode.
Figure 3:
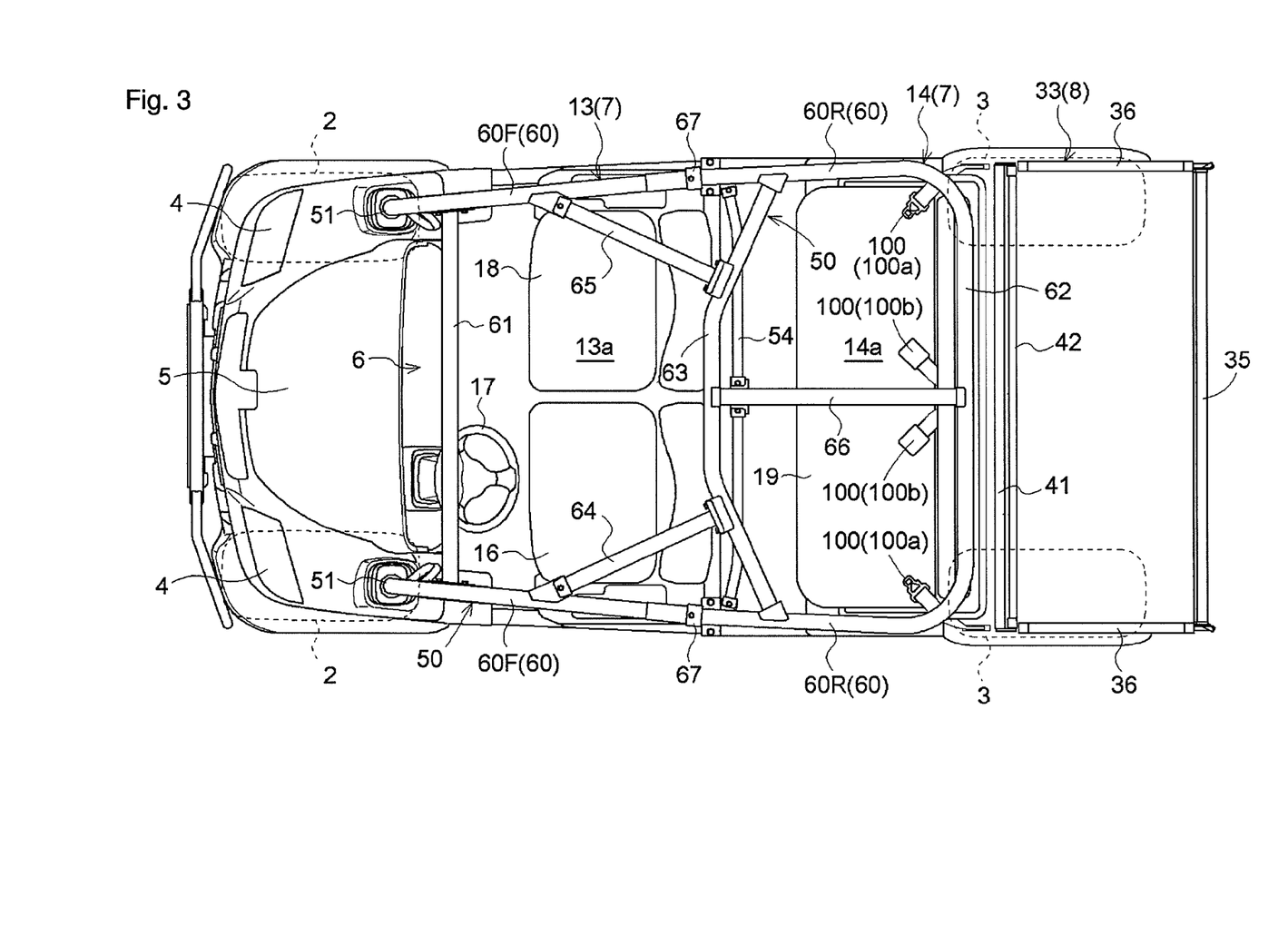
FIG. 3 is a plan view illustrating the entire work vehicle while the carrier bed on the work vehicle is switched to a first mode.

Embodiments of the present invention are explained below based on the drawings. As illustrated in FIGS. 1 and 3, a work vehicle according to a first embodiment of the present invention is a traveling vehicle equipped with a pair of left and right front wheels 2, and a pair of left and right rear wheels 3 at the lower part of the vehicle body frame 1. The front end of the traveling vehicle is provided with a front cover 5 equipped with a pair of left and right headlamps 4. A platform or cockpit section 7 equipped with a ROPS 6 is provided behind the front cover 5 of the traveling vehicle. A carrier bed 8 is placed at the rear section of the traveling vehicle.

The traveling vehicle is equipped with an engine 9 located between the front wheels 2 and the rear wheels 3. The traveling vehicle is a four-wheel drive: the drive power output from the engine 9 is input to the transmission 10, changing the vehicle speed; the drive power created after the speed change drives the front wheels 2 and the rear wheels 3.

Next, the platform 7 is described. In addition to the ROPS 6, the platform 7 is provided with a front platform 13 (corresponding to the "cockpit platform"), a rear platform 14, and a partition 15. The front platform 13 is placed in the front portion of the platform 7 with the ROPS 6 forming a front platform space 13a for carrying a passenger; the rear platform 14 is placed behind the front platform 13 with the ROPS 6 forming a rear platform space 14a for carrying a passenger. The partition 15 separates the front platform space 13a and the rear platform space 14a, from the rearward object loading space.

A driver's seat 16 is provided in the left region of the front platform space 13a. A steering wheel 17 is provided in front of the driver's seat 16 for manipulating the direction and operation of the front wheels 2. The front platform 13 configures the cockpit platform.

The front platform 13 is also equipped with a front seat 18 provided in the right region of the front platform space 13a; thus, the front platform 13 may carry two passengers. The driver's seat 16 and the front seat 18 are equipped with separately manufactured seat portions and back portions, and are thus separate seats. The driver's seat 16 and the front seat 18 are configured to slide forward or backward freely via a rail.

A rear seat 19 is provided on the rear platform 14. The rear seat 19 is configured as a bench capable of seating two people; thus the rear platform 14 may carry two passengers.

Figure 4:
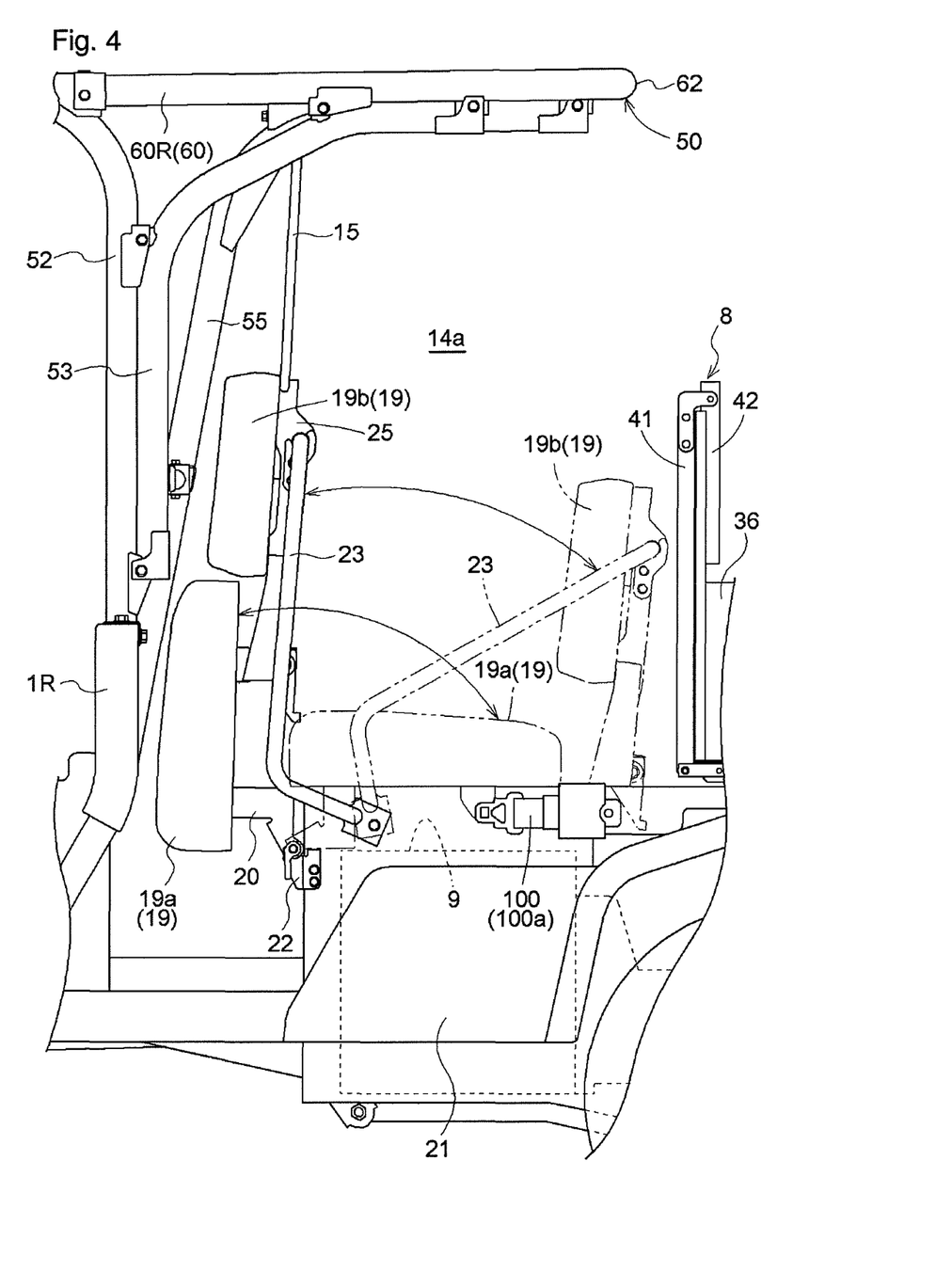
FIG. 4 is a side view illustrating position changes of a rear seat.

The rear seat 19 is configured to be freely convertible between two modes: a seating mode illustrated by the double dotted line in FIG. 4, and a storage mode illustrated by the solid line in FIG. 4. Specifically, the rear seat 19 is configured as described below.

The rear seat 19 is equipped with a horizontally long seat portion 19a and a horizontally long back portion 19b. The seat portion 19a is supported by a support 22 provided on a rear seat support 21, via an attachment 20 provided on the front end of the seat portion 19a. The seat portion 19a is configured to pivot forward or backward about the axis center of a coupling shaft that couples the attachment 20 and the support 22. The pivoting of the seat portion 19a forward or backward moves the seat portion 19a into a seating position established over a top panel of the rear seat support 21, and a storage position established on the rear side of the driver's seat 16 and the front seat 18. The seat portion 19a may be configured so that a maintenance access point provided in the top panel of the rear seat support 21 can be closed and opened by moving the seat portion 19a into the seating position and the storage position respectively. The rear seat support 21 houses the engine 9 and acts as an engine hood. That is, the seat portion 19a functions as a lid that covers a maintenance access port used when examining or repairing the inside of the rear seat support 21 or the engine 9.

The back portion 19b is coupled to the upper ends of a pair of left and right linking members 23 arranged on both sides widthwise of the rear seat 19. The lower ends of the pair of left and right linking members 23 are rotatably supported on the rear seat support 21. The upper ends of the pair of left and right linking members 23 are rotatably coupled to a coupling member 25 provided on the rear side of the back portion 19b. When the back portion 19b is in the seating position, the pair of left and right linking members 23 are arranged slanting downward from the rear to the front thereof, and act as arm rests in this state. The lower end of the partition 15 is coupled to a coupling structure 25 provided on the rear side of the back portion 19b. For instance, the partition 15 may be provided with a partition frame and a net-like member; the partition frame may be produced using frames horizontally-oriented and a vertically-oriented relative to the vehicle body, coupled to produce the partition frame; and the net-like member tensioned between portions on the partition frame.

Namely, when the back portion 19b is moved forward or backward, the linking members 23 pivot front and back with the coupling point as a pivot relative to the rear seat support 21. Additionally, the partition 15 moves forward and backward together with the coupling member 25 in the rear platform space 14a. Thus, the back portion 19b moves between a seating position established above the seating position of the seat portion 19a, and the storage position established above the storage position of the seat portion 19a.

As illustrated in FIGS. 1 and 4, the rear seat 19 is held in the seat location toward the rear of the rear platform space 14a, and placed in the seating mode by moving the seat portion 19a and back portion 19b thereof to the seating position and securing the rear seat 19 at the seating position with a locking mechanism (not shown). Placing the rear seat 19 in the seating mode creates a two-row seating feature in the work vehicle where passengers may board the front platform 13 and rear platform 14. Furthermore, switching the rear seat 19 to the seating mode moves the partition 15 to a rear partition position. The rear partition position is for the two-row seating feature, where the rear partition position is at the rear end of the rear platform 14. Namely, the rear partition position partitions off the rear platform space 14a from the object loading space behind the rear platform space 14a.

Figure 2:
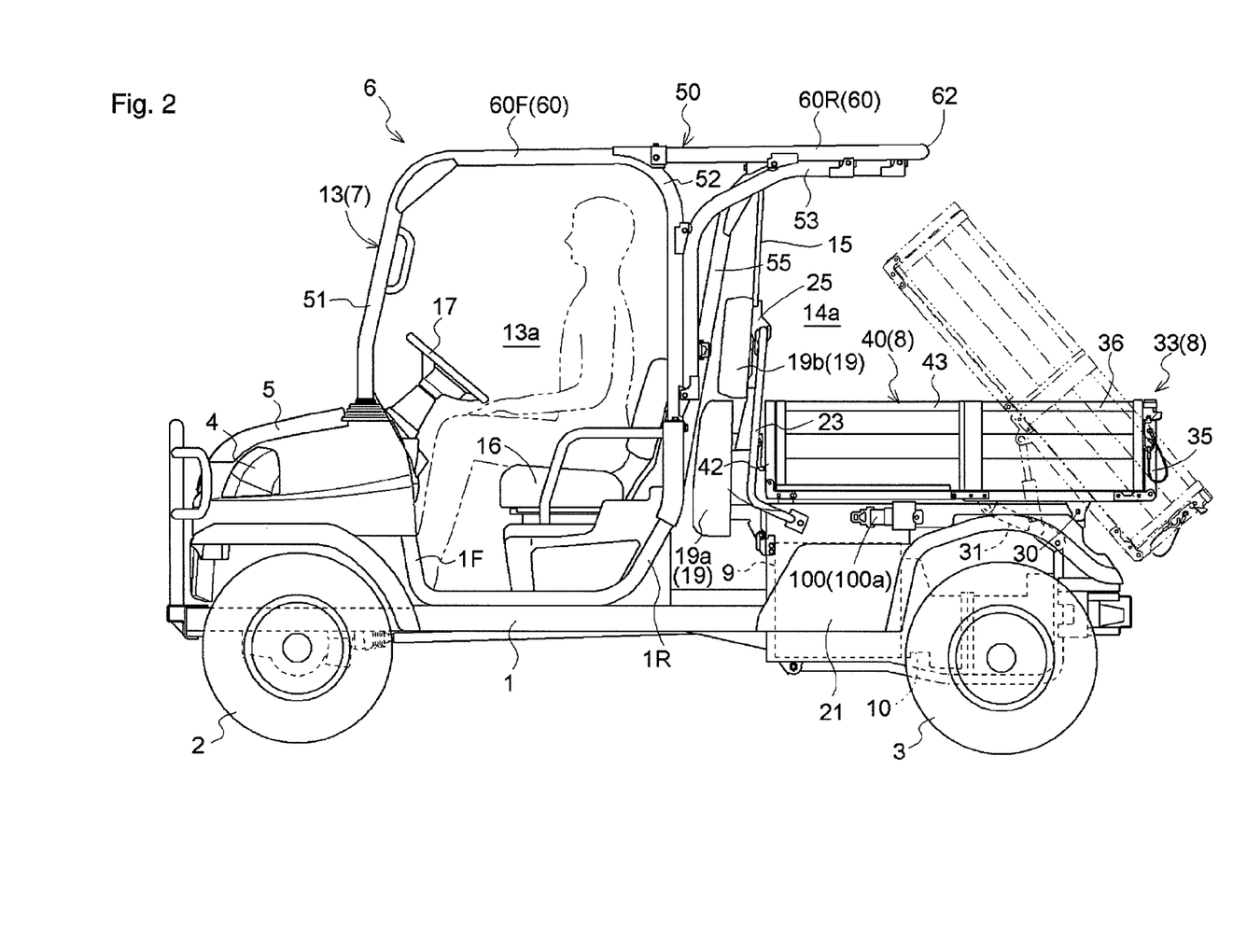
FIG. 2 is a side view illustrating the entire work vehicle while the carrier bed on the work vehicle is switched to a second mode.

As illustrated in FIGS. 2 and 4, the rear seat 19 is held in the location in front of the seat location in the rear platform space 14a, and placed in the storage mode by moving the seat portion 19a and the back portion 19b to the storage position and securing the rear seat 19 at the storage position with a locking mechanism (not shown). Placing the rear seat 19 in the storage mode creates a single row of seating in the work vehicle where passengers can board only the front platform 13 out of the front platform 13 and the rear platform 14. Furthermore, switching the rear seat 19 to the storage mode moves the partition 15 to a forward partition position. The forward partition position is for the single-row seating feature, where the forward partition position is toward the front of the rear platform space 14a. Namely, the forward partition position partitions off the front platform space 13a from the object loading space behind the front platform space 13a.

As illustrated in FIGS. 1, 2, 3, and 4, the rear seat 19 is provided with a seatbelt 100. The seatbelt 100 is provided on the vehicle frame. Therefore, the seatbelt 100 does not move with the rear seat 19 when the rear seat 19 changes positions (refer to FIG. 2). In the embodiment, as illustrated in FIG. 3, a main seatbelt part 100a is provided on the outer section of the vehicle body, and a seatbelt locking part 100b for engaging the seatbelt is provided on the inner section of the vehicle frame. The main seatbelt part 100a may be stored in a reel and the like. The rear seat 19 may be configured to slide forward and backward along a rail structure and the like. Although not shown, similar seat belts may also be provided for the driver's seat 16 and the front seat 18. These seat belts may also be provided on the vehicle frame.

The carrier bed 8 is described. As illustrated in FIG. 1, the carrier bed 8 is supported on the vehicle body to pivot vertically via a dumping fulcrum shaft 30. The dumping fulcrum shaft 30 is arranged near the rear end of the carrier bed 8 and is horizontally-oriented relative to the vehicle. An elevation control cylinder 31 is provided extending between the under surface of the carrier bed 8 and the vehicle body frame 1; the elevation control cylinder 31 lifts and lowers the carrier bed 8 so that the carrier bed 8 may move from a loading position through to a dumping position. The carrier bed 8 is horizontal or substantially horizontal to the vehicle body in the loading position, and the front end of the carrier bed 8 is raised high above the vehicle body in the dumping position.

Figure 7:
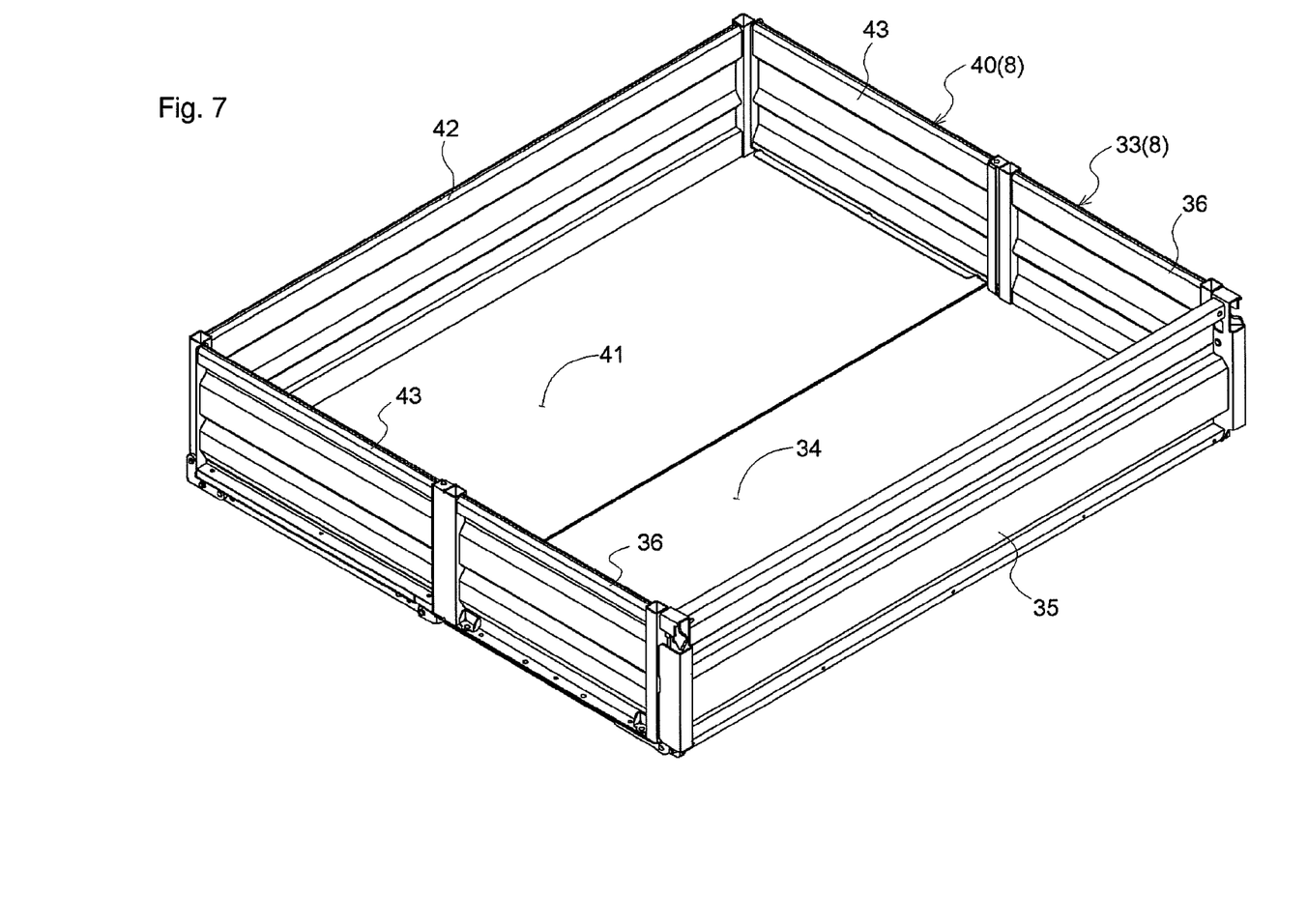
FIG. 7 is a perspective view illustrating the carrier bed in the second mode.

As illustrated in FIGS. 2 and 7, the carrier bed 8 is equipped with a main bed 33 and an expanding bed 40. The main bed 33 includes a bottom panel 34 having an under surface thereof coupled to the elevation control cylinder 31; the expanding bed 40 includes an expanding bottom panel 41 having a rear end thereof coupled to the front end of the bottom panel 34.

In addition to the bottom panel 34, the main bed 33 includes a rear panel 35 coupled to the rear end of the bottom panel 34, and side panels 36 coupled to both ends widthwise of the bottom panel 34.

Figure 6:
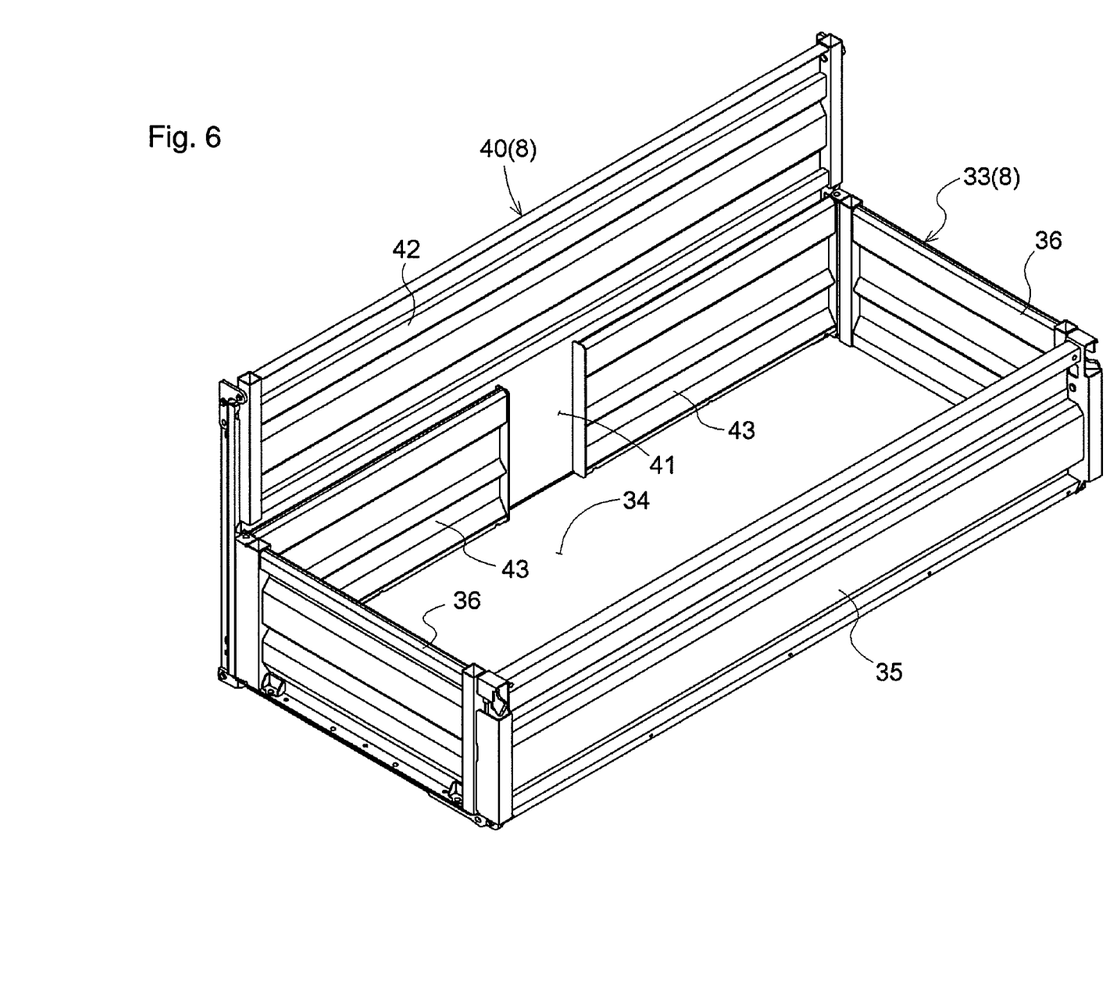
FIG. 6 is a perspective view illustrating the carrier bed in the first mode.

In addition to the expanding bottom panel 41, the expanding bed 40 includes a front panel 42 and expanding side panels 43. The front panel 42 is coupled to the front end of the expanding bottom panel 41 to pivot vertically about an axis center 42a (refer to FIG. 8B); and the expanding side panels 43 are coupled to the front ends of the left and right side panels 36 on the main bed 33 to pivot laterally of the carrier bed about the axis center 43a (refer to FIG. 8A). The expanding bottom panel 41 is configured to pivot vertically about an axis center 41a (refer to FIG. 8C) relative to the bottom panel 34 of the main bed 33; and the expanding bed 40 is configured to switch between a collapsed mode illustrated in FIGS. 1 and 6, and an expanded mode illustrated in FIGS. 2 and 7.

Figures 8A, 8B:
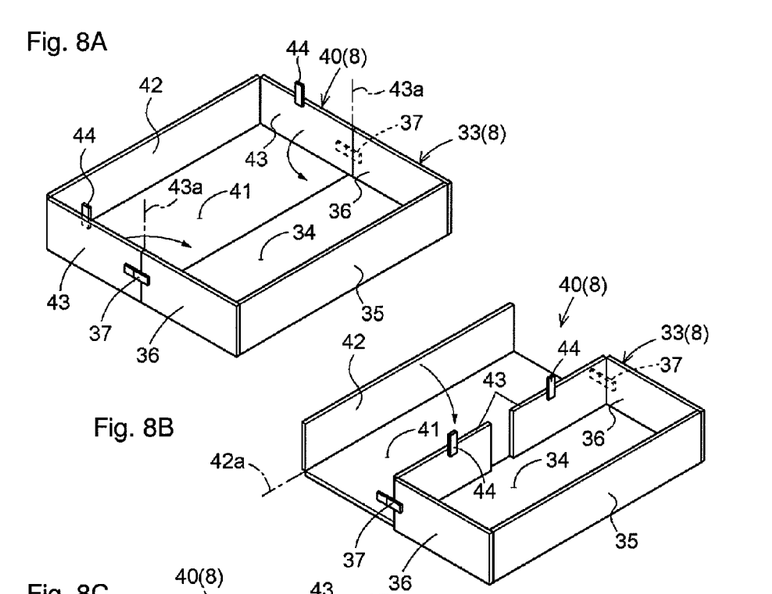
FIGS. 8A to 8D are explanatory diagrams illustrating convertible elements of the carrier bed.
Figures 8C, 8D:
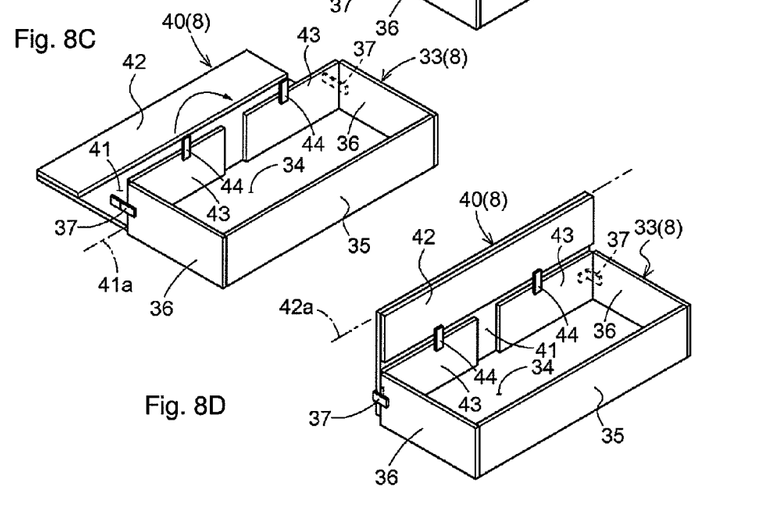

FIGS. 8A to 8D are explanatory diagrams illustrating convertible elements of the carrier bed 8. FIG. 8A illustrates the expanded mode of the expanding bed 40. FIG. 8D illustrates the collapsed mode of the expanding bed 40. As illustrated in FIG. 8B, the left and right expanding side panels 43 may be pivoted toward the inside of the carrier bed to fold along the front edge of the bottom panel 34. In addition, stop members (not shown) limit the pivoting of the left and right expanding side panels 43 while the expanding side panels 43 are at right angles or substantially right angles to the side panels 36. Next, as illustrated in FIG. 8C, the front panel 42 is pivoted downward towards the upper surface of the expanding bottom panel 41 to a collapsed position where the front panel 42 overlaps with the upper surface of the expanding bottom panel 41. As illustrated in FIG. 8D, the expanding bottom panel 41 is pivoted upward towards the expanding side panels 43, which are collapsed. The expanding bed 40 is switched over to a collapsed mode when the expanding bed 40 collapses and overlaps with the outer surfaces of the expanding side panels 43.

The expanding bed 40 may be switched to a collapsed mode to convert the carrier bed 8 to a first mode. Namely, collapsing the expanding bed 40 reduces the length of the carrier bed 8. Referring to the expanding bed 40 in a collapsed mode, when the left and right expanding side panels 43 are in the collapsed mode, the left and right expanding side panels 43 are located further inward than the expanding bottom panel 41 in the carrier bed. Therefore, the carrier bed 8 has a shorter length in a first mode by as much as the thickness of the expanding side panels 43, compared to when the expanding side panels 43 are located further outward of the carrier bed than the expanding bottom panel 41 when in the collapsed mode.

As illustrated in FIGS. 8A to 8D, the embodiment may be further provided with left and right locking mechanisms 37 that secure the expanding bottom panel 41 and the left and right side panels 36 while the carrier bed 8 is in the collapsed mode. The stop members 44 may also be provided on the upper ends of the left and right expanding side panels 43.

Figures 9A, 9B:
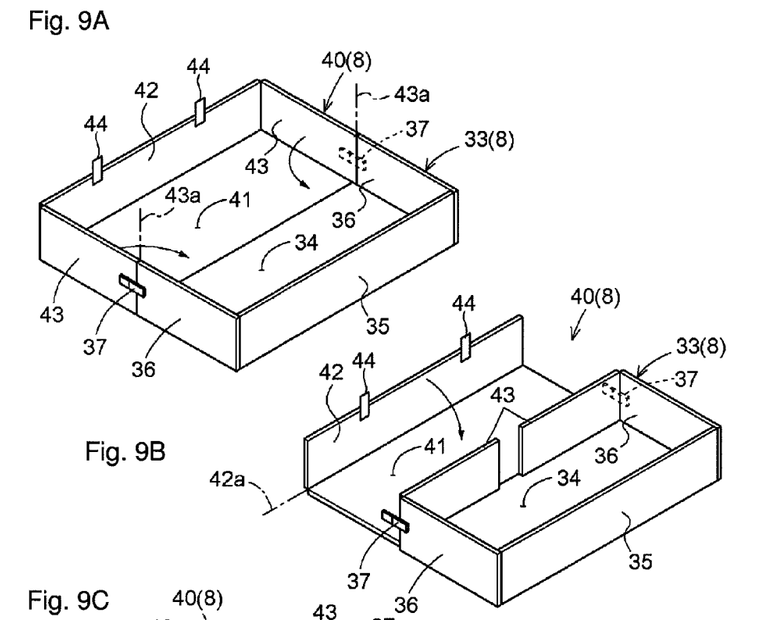
FIGS. 9A to 9D are explanatory diagrams illustrating convertible elements of the carrier bed.
Figures 9C, 9D:
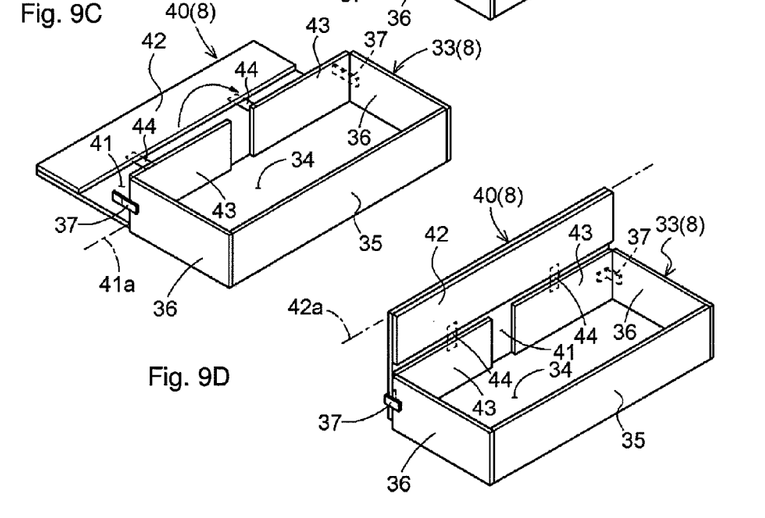

The stop members 44 limit the upward rotation of the front panel 42 about the axis center 42a. That is, when the front panel 42 begins to rotate upward about the axis center 42a, the front panel 42 comes into contact with the stop members 44 thereby maintaining the front panel 42 in that position. When a lock mechanism 37 is placed between the expanding bottom panel 41 and the left and right side panels 36 in this configuration, the position of the front panel 42 can be maintained with a simple configuration without needing to provide a complicated lock mechanism to maintain the position of the front panel 42. In addition, as illustrated in FIGS. 9A to 9D, the stop members 44 may be provided on the upper end of the front panel 42. In this case, as illustrated in FIG. 9D, in a first state the stop members 44 are sandwiched between the expanding bottom panel 41 and the expanding side panels 43, thereby maintaining the position of the front panel 42.

As illustrated in FIGS. 1 and 3, switching the carrier bed 8 to a first mode, reduces the length of the carrier bed 8, positioning the front end of the carrier bed 8 behind the rear platform space 14a, and providing the work vehicle with a two-row seating feature.

As illustrated in FIG. 8C, the expanding bottom panel 41 is placed at an extended position where the expanding bottom panel 41 is pivoted downward toward the front to lay flatly or substantially flatly alongside the bottom panel 34. Next, as illustrated in FIG. 8B, the front panel 42 is placed at an extended position where the front panel 42 is pivoted upward from the front end of the expanding bottom panel 41. Subsequently, as illustrated in FIG. 8A, the expanding bed 40 can be switched to an expanded mode when the left and right expanding side panels 43 are placed at an extended position where the left and right expanding side panels 43 are pivoted toward the outside of the carrier bed, to lay flatly or substantially flatly alongside the side panels 36.

The expanding bed 40 can be switched to an expanded mode, converting the carrier bed 8 to a second mode. Namely, placing the expanding bed 40 at the extended position increases the length of the carrier bed 8.

As illustrated in FIG. 2, when the carrier bed 8 is converted to the second mode, the front end of the carrier bed 8 enters the rear platform space 14a (in other words, when viewed from the top of the carrier bed 8, overlaps with the later described rearward overhanging frame) to expand the length of the carrier bed 8. At this point, the rear seat 19 is converted to the storage mode, and the partition 15 moves to the forward partition position creating a single-row seating feature to allow the front end of the carrier bed 8 to enter the rear platform space 14b. The front end of the carrier bed 8 enters the empty seat location (the location at which the rear seat 19 is situated when the rear seat 19 is in seating mode) in the rear platform space 14a after switching the rear seat 19 to the storage mode.

Figure 5:
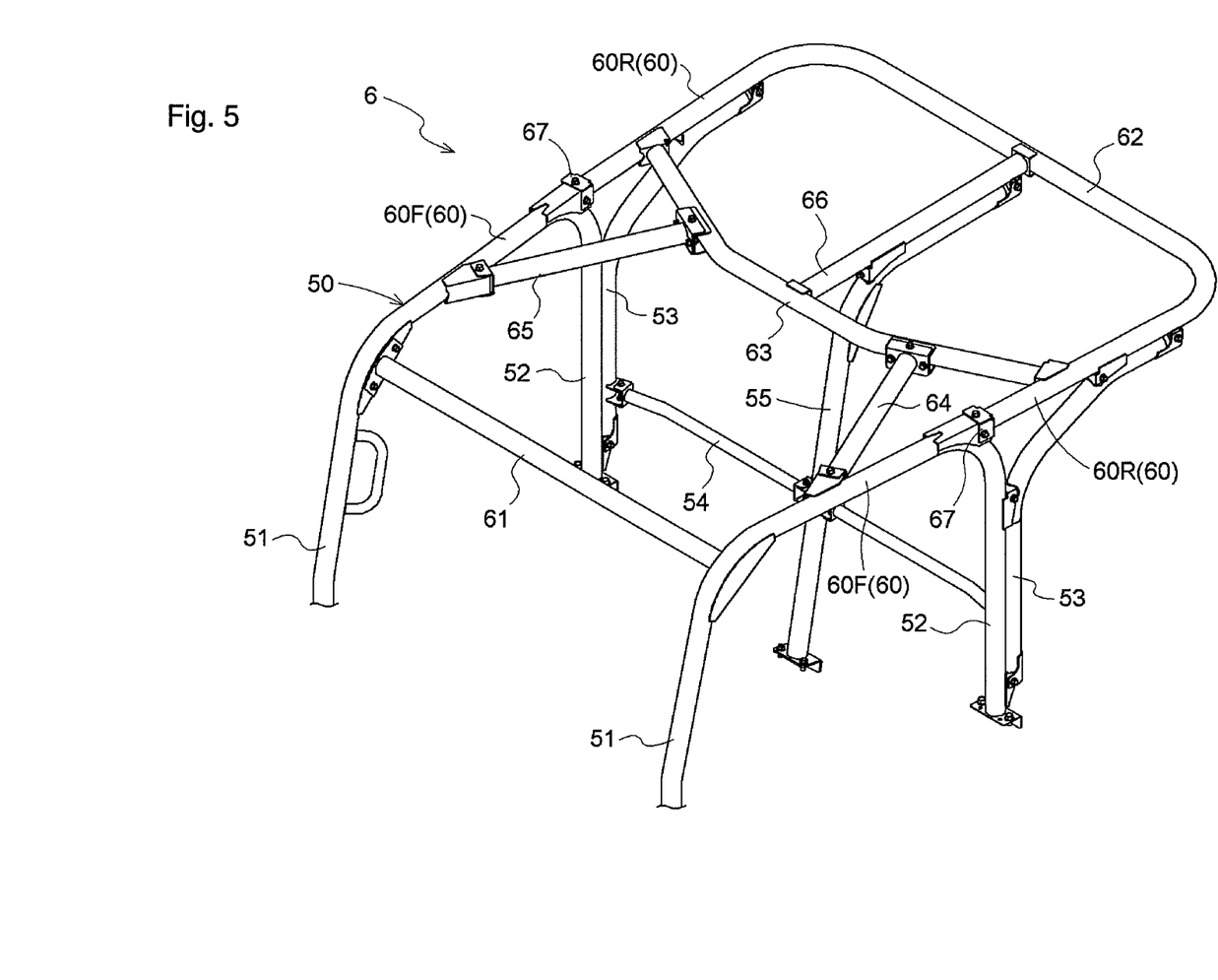
FIG. 5 is a perspective view illustrating a rollover protective structure (ROPS)

Next, the ROPS 6 is described. As illustrated in FIGS. 1, 3, and 5, the ROPS 6 is provided with an upper frame 50, a pair of left and right front supporting columns 51, and a pair of left and right rear supporting columns 52. The upper frame 50 is located above the front platform space 13a and the rear platform space 14a lengthwise of the vehicle. The pair of vertically-oriented front supporting columns 51 is arranged with one column on each outer front end widthwise of the vehicle at the front end of the front platform space 13a; and the pair of vertically-oriented rear supporting columns 52 is arranged with one column on each outer end widthwise of the vehicle, between the front platform 13 and the rear platform 14. The ROPS 6 is constructed to not to overlap with the first mode or second mode carrier bed 8 when the vehicle is viewed from the side. Additionally, the upper frame 50 hangs over beyond the rear supporting columns 52 at the same height as the rear supporting columns 52.

The front supporting columns 51 and the rear supporting columns 52, as well as the reinforcing support column 55 are now described in further detail. The upper ends of the pair of left and right front supporting columns 51 are individually coupled on both widthwise side ends at the front end of the upper frame 50; the lower ends of the pair of left and right front supporting columns 51 are individually coupled at the upper ends of vertically-oriented front supporting frames 1F, 1F provided on the vehicle body frame 1. The pair of left and right front supporting columns 51 supports the front ends of the upper frame 50, and the front end of the ROPS 6 is supported on the vehicle body frame 1.

The upper ends of the pair of left and right rear supporting columns 52 are individually coupled on both side ends at the middle portion of the upper frame 50; the lower ends of the pair of left and right rear supporting columns 52 are individually coupled at the upper ends of vertically-oriented rear supporting frames 1R, 1R provided on the vehicle body frame 1. The pair of left and right rear supporting columns 52 supports the middle portion of the upper frame 50, and the rear end of the ROPS 6 is supported on the vehicle body frame 1.

The front ends and rear ends of the front supporting frames 1F, and rear supporting frames 1R respectively on the left and the right side of the vehicle are oriented vertically relative to the vehicle body. The middle portions between the front and rear of each front supporting frame 1F, and rear supporting frame 1R on the left and right side of the vehicle are oriented lengthwise of the vehicle body and curved to form a single frame component.

As illustrated in FIG. 2, the left and right rear supporting columns 52 are located in front of the front end of the carrier bed 8 when the carrier bed 8 is in the second mode. As illustrated in FIG. 1, the left and right rear supporting columns 52 are located in front of the rear seat 19 while the rear seat is in a seating mode, facilitating passage between the rear seat 19 and the rear supporting columns 52.

As illustrated in FIGS. 1 and 5, reinforcing frames 53 are coupled at the left and right rear supporting columns 52 spanning from the lower end of the rear supporting columns 52 to the location behind where the upper frame 50 is coupled to the rear supporting columns 52. The lower end portions of the left and right reinforcing frames 53 are coupled by a horizontally-oriented coupling frame 54.

Further, as illustrated in FIGS. 1, 2, and 4, the lower end of the reinforcing support column 55 is supported on a side of the vehicle body frame 1 at substantially the same location lengthwise as the rear supporting columns 52. The reinforcing support column 55 rises from the lower end and extends upward with an inclination so as to be placed progressively rearward, with a predetermined region of the upper end extending along a rear-center coupling frame 66 (later described), and is coupled to the rear-center coupling frame 66. In the embodiment, the rear-center coupling frame 66 is a single component provided in the center widthwise of the vehicle body.

Next, the upper frame 50 is described in detail. As illustrated in FIGS. 3 and 5, the upper frame 50 is provided with a pair of left and right lengthwise main frames 60; a horizontal front coupling frame 61; a horizontal rear coupling frame 62 (corresponding to a "first coupling frame"); and a horizontal center coupling frame 63 (corresponding to a "second coupling frame"). The front coupling frame 61 couples the front ends of the left and right main frames 60; the rear coupling frame 62 couples the rear ends of the left and right main frames 60; and the center coupling frame 63 couples the center portion the middle portion lengthwise of the left and right main frames 60.

The section close to the left end of the center coupling frame 63 and the front frame 60F of the left main frame 60 are coupled together by an inclined left coupling frame 64 (corresponding to a "third coupling frame"). The section close to the right end of the center coupling frame 63 and the front frame 60F of the right main frame 60 are coupled together by an inclined right coupling frame 65 (corresponding to a "third coupling frame"). The center portions of center coupling frame 63 and the rear coupling frame 62 are coupled together by lengthwise oriented rear-center coupling frame 66 (corresponding to "fourth coupling frame"). In addition, the pair of left and right front frames 60F may be coupled by the center coupling frame 63; further, the center coupling frame 63 and the pair of left and right rear frames 60R may be coupled by the left coupling frame 64 and the right coupling frame 65.

The left and right main frames 60 are configured by coupling the front frame 60F and the rear frame portion 60R of the main frames 60 with a coupling 67. The sections of the main frames 60 in front of the locations where the rear supporting columns are coupled configure the front frames 60F; additionally the sections of the main frames 60 behind the locations where the rear supporting columns are coupled configure the rear frames 60R. Further, the front frames 60F and the rear frames 60R may be configured by a single frame material.

The front supporting columns 51, the rear supporting columns 52, and the front frames 60F of the main frames 60 on the left and right sides of the ROPS 6 are respectively configured from a single frame material. That is, a single frame material is bent such that the front ends thereof configure the front supporting columns 51, the rear ends configure the rear supporting columns 52, and the center portion becomes the front frames 60F near the front of the main frames 60. The front supporting columns 51, the rear supporting columns 52, and the front frames 60F on the main frames 60 may be configured by coupling together a plurality of frame materials. The left and right rear frames 60R of the main frames 60, and the rear coupling frame 62 are configured from a single frame material. That is a single frame material is bent such that both ends thereof configure the rear frames 60R, and the center portion configures the rear coupling frame 62. The left and right rear frames 60R and the rear coupling frame 62 of the main frames 60 may be configured by coupling together a plurality of frame materials.

In this manner, the rear frames 60R and the rear coupling frame 62 extend rearward from the upper portion of the rear supporting columns 52. In the embodiment, the rear frames 60R and the rear coupling frame 62 extend rearward from behind the rear supporting columns 52 at the same height as the upper end of the rear supporting columns. In other words, in the present embodiment, the rear frames 60R and the rear coupling frame 62 configure the rearward overhanging frame. Additionally, the lower end of the reinforcing support column 55 is supported on the vehicle body frame 1, while the upper end is coupled to the rear-center coupling frame 66. Hereby, the reinforcing support column 55 supports the rearward overhanging frame.

OTHER EMBODIMENTS (1) In the above-described embodiment, the work vehicle may be configured as follows. Namely, the work vehicle may be configured with a two-row seating feature, and provided with a platform 7 including a front platform 13 and a rear platform 14, but with a carrier bed 8 that does not convert to a second mode.

(2) In the above-described embodiment, the work vehicle may be configured as follows. Namely, the work vehicle configured with the single-row seating feature is provided with the platform 7 acting as the cockpit and corresponding to the front platform 13. The work vehicle is not, however, provided with a rear platform 14.

(3) The above-mentioned embodiment exemplifies the adoption of a collapsible expanding bed 40 that makes it possible to switch the carrier bed 8 between a first mode and a second mode; however, an expanding bed may be supported to slide forward or backward lengthwise relative to the main bed 33 so that the expanding bed has an adjustable protruding length from the front of the main bed 33.

(4) The above-mentioned embodiment exemplifies adopting a configuration where the carrier bed 8 can switch between a first mode and a second mode by changing the longitudinal length of the carrier bed 8; however, the carrier bed 8 may be configured to switch between the first mode and the second mode by sliding the entire carrier bed 8 along the length of the vehicle body without changing the longitudinal length of the carrier bed 8. Additionally, it is not required that the carrier bed 8 be able to switch between the first mode and the second mode.

(5) The above-mentioned embodiment exemplifies adopting a configuration where the rear seat 19 switches to a storage mode and the front end of the carrier bed 8 enters the empty seat location created thereby; however, the embodiment may be configured such that the front end of the carrier bed 8 enters the rear platform space 14a while the rear seat 19 is still in the seating mode.

(6) The above-mentioned embodiment exemplifies adopting a configuration where switching the rear seat 19 from to and from the seating mode and the storage mode moves the partition 15 forward and backward; however, the embodiment may be configured such that the forward and backward movement of the partition 15 and switching of the rear seat 19 to and from the seating mode and the storage mode are carried out separately. In this case, for instance, the embodiment may be configured such that the partition 15 is supported on the ROPS or on the vehicle body frame via rails or linking components. Additionally, the partition 15 may be provided with separate attachment locations for when the rear seat is in the seating mode, and when the rear seat is in the storage mode. The attachment location for the partition 15 may also be modified.

(7) The frame structure of the ROPS 6 illustrated in the above-mentioned embodiment is merely one example. If the ROPS is provided with a rearward overhanging frame then a variety frame structures may be adopted. For example, a frame structure may be adopted that excludes a portion or all of, for example, the reinforcing frames 53, the reinforcing support column 55, the rear coupling frame 62, the center coupling frame 63, the left coupling frame 64, the coupling frame 65, and the rear-center coupling frame 66; or frame elements besides those above mentioned, and the like. Finally, the rearward overhanging frame may be configured by a section of the reinforcing frames 53 extending behind the reinforcing frames 53 and the like; the rearward overhanging frame may also be configured by frame elements other than the rear frames 60R, and the rear coupling frame 62.

INDUSTRIAL APPLICABILITY

The present invention may be applied to a variety of work vehicles.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle comprising:
   a vehicle body;
   a cockpit section arranged in a front area of the vehicle body;
   a carrier bed arranged in a rear area of the vehicle body;
   a rollover protective structure protecting the cockpit section;
   the rollover protective structure including:
      a pair of left and right front supporting columns arranged in a front area of the cockpit section;
      a pair of left and right rear supporting columns arranged in a rear area of the cockpit section;
      a rearward overhanging frame extending rearward from an upper part of the rear supporting columns; and
      a rear end and corner areas of the rearward overhanging frame being free of and unsupported by any vertical supporting columns.

2. The work vehicle according to claim 1, wherein the rollover protective structure further includes a pair of left and right front frames connecting an upper part of the left and right front supporting columns and an upper part of the left and right rear supporting columns, and the rearward overhanging frame extends rearward from the front frames.

3. The work vehicle according to claim 1, wherein the rearward overhanging frame includes a pair of left and right rear frames extending along a front to back direction of the vehicle, and a first coupling frame that couples rear end portions of the pair of left and right rear frames.

4. The work vehicle according to claim 3, wherein the rollover protective structure further includes a second coupling frame arranged in front of the first coupling frame.

5. The work vehicle according to claim 4, wherein the rollover protective structure includes a pair of left and right third coupling frames each having an end extending from the second coupling frame.

6. The work vehicle according to claim 5, wherein the rearward overhanging frame includes a fourth coupling frame that has ends coupled to the first coupling frame and the second coupling frame.

7. The work vehicle according to claim 1, wherein the rollover protective structure further includes a reinforcing support column arranged behind the rear supporting columns and functioning to support the rearward overhanging frame.

8. The work vehicle according to claim 1, wherein the rearward overhanging frame overlies a rear cockpit section located behind the cockpit section.

9. The work vehicle according to claim 8, wherein the carrier bed is configured to assume first and second modes of configuration, wherein, in the first mode, a front end of the carrier bed is located behind a rear cockpit section, and, in the second mode, the front end of the carrier bed extends into the rear cockpit section.

10. The work vehicle according to claim 9, further comprising a rear seat arranged in the rear cockpit section, said rear seat being configured to assume a deployed or seating mode allowing seating in the first mode of the carrier bed, and a storage or non-deployed mode.

11. The work vehicle according to claim 1, further comprising:
   a carrier bed configured to assume first and second modes of configuration, wherein, in the first mode, a front end of the carrier bed is located behind a rear cockpit section, and, in the second mode, the front end of the carrier bed extends into the rear cockpit section; and
   locking mechanisms configured to retain in place panels of the carrier bed.

12. The work vehicle according to claim 1, further comprising:
   a carrier bed with folding panels; and
   reinforcing frame members connecting the rearward overhanging frame to the left and right rear supporting columns.

13. A work vehicle comprising:
   a vehicle body;
   a cockpit section arranged in a front area of the vehicle body;
   a carrier bed arranged in a rear area of the vehicle body;
   a rollover protective structure protecting front and rear cockpit sections; and
   the rollover protective structure including:
      a pair of left and right front supporting columns located in a front area of the front cockpit section;
      a pair of left and right rear supporting columns located in an area behind the front cockpit section;
      a rearward overhanging frame that extends rearward from an upper part of the rear supporting columns and overlies the rear cockpit section; and
      a rear end and corners of the rearward overhanging frame being free of and unsupported by any vertical supporting columns for more than half a distance between the rear end and the upper part of the rear supporting columns.

14. The work vehicle according to claim 13, wherein the rollover protective structure further includes a pair of left and right front frames connecting an upper part of the left and right front supporting columns and an upper part of the left and right rear supporting columns.

15. The work vehicle according to claim 13, wherein the rearward overhanging frame includes a pair of left and right rear frames, and a first coupling frame that couples rear end portions of the pair of left and right rear frames.

16. The work vehicle according to claim 15, wherein the rollover protective structure further includes a second coupling frame spaced from the first coupling frame.

17. The work vehicle according to claim 16, wherein the rollover protective structure further includes a pair of left and right third coupling frames having ends extending from the second coupling frame and each coupling one of the pair of left and right front frames.

18. The work vehicle according to claim 17, wherein the rearward overhanging frame includes a fourth coupling frame that has opposite ends coupled to the first coupling frame and the second coupling frame.

19. The work vehicle according to claim 13, wherein the rollover protective structure further includes a reinforcing support column located behind and adjacent to the rear supporting columns.

20. The work vehicle according to claim 13, wherein the rearward overhanging frame has a rear section that is unsupported by columns.

21. The work vehicle according to claim 13, wherein the carrier bed is configured to assume different modes of configuration, wherein, in a first mode, a front end of the carrier bed is located behind the rear cockpit section, and, in a second mode, the front end of the carrier bed extends within the rear cockpit section.

22. The work vehicle according to claim 21, further comprising a rear seat arranged in the rear cockpit section, said rear seat being structured and arranged to assume a deployed seating configuration and a stowed non-seating configuration.

23. A work vehicle comprising:
a vehicle body;
a cockpit section arranged in a front area of the vehicle body;
a carrier bed arranged in a rear area of the vehicle body;
a rollover protective structure protecting the cockpit section;
the rollover protective structure including:
  a pair of left and right front supporting columns arranged in a front area of the cockpit section;
  a pair of left and right rear supporting columns arranged in a rear area of the cockpit section;
  a rearward overhanging frame extending rearward from an upper part of the rear supporting columns so as to overlie a rear cockpit section;
  the rearward overhanging frame overlying a seating area of the rear cockpit section and comprising a horizontal member, corners and left and right side members,
  wherein the horizontal member, the corners and the side members are unsupported by any vertical supporting columns in an area from a center a seat bottom of the seating area to a rearmost end of the rearward overhanging frame.

* * * * *